United States Patent
Muto

(10) Patent No.: US 7,360,047 B2
(45) Date of Patent: Apr. 15, 2008

(54) STORAGE SYSTEM, REDUNDANCY CONTROL METHOD, AND PROGRAM

(75) Inventor: Yoshiaki Muto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 11/270,443

(22) Filed: Nov. 10, 2005

(65) Prior Publication Data

US 2007/0067584 A1    Mar. 22, 2007

(30) Foreign Application Priority Data

Sep. 21, 2005    (JP) .............................. 2005-273474

(51) Int. Cl.
*G06F 12/00* (2006.01)
*G06F 11/00* (2006.01)

(52) U.S. Cl. ............................ 711/162; 711/100; 714/5

(58) Field of Classification Search ..................... None
See application file for complete search history.

(56) References Cited

FOREIGN PATENT DOCUMENTS

JP    7-36629    7/1993

*Primary Examiner*—Donald Sparks
*Assistant Examiner*—Mehdi Namazi
(74) *Attorney, Agent, or Firm*—Reed Smith LLP; Stanley P. Fisher, Esq.; Juan Carlos A. Marquez, Esq.

(57) ABSTRACT

In a storage system allowing redundant writing, a technology is provided capable of achieving control including efficient return to redundancy while reducing load on a host and trouble for a user. The host performs the redundant writing of data into data volumes in primary and secondary storage apparatuses. Each storage apparatus retains information including update data from the host as a journal (update data history information). When one of two systems for redundant writing is in a failed state and it is to be returned to a redundant state, the storage apparatuses communicate with each other regarding the journals not through the host. A retained portion of the journal of the normal system after the latest synchronization point required for synchronizing the volumes is transferred through data copy to the system to be recovered. Based on the transferred portion of the journal, the volume is restored and synchronized.

7 Claims, 9 Drawing Sheets

FIG. 7

305 : V STATE MANAGEMENT INFORMATION

| | PRIMARY S – PRIMARY V | | SECONDARY S – SECONDARY V | |
|---|---|---|---|---|
| | DEVICE STATE | COPY STATE | DEVICE STATE | COPY STATE |
| a | ACT | — | ACT | — |
| | | | FAILURE OCCURS IN SECONDARY SYSTEM | |
| b | ACT | — | INACT | — |
| | | ISSUE INSTRUCTION FOR SYNCHRONIZATION TO NORMAL SYSTEM | BLOCK SECONDARY V | |
| c | ACT | COPY | INACT | — |
| | | INTER-DISK COPYING | | |
| d | ACT | SYNC | INACT | — |
| | | DATA V SYNCHRONIZATION COMPLETED | | FAILURE OF SECONDARY SYSTEM NOT RECOVERED |
| | | INSTRUCTION FOR SYNCHRONIZATION AGAIN | | |
| e | ACT | COPY | INACT | — |
| f | ACT | SYNC | INACT | FAILURE OF SECONDARY SYSTEM RECOVERED |
| g | ACT | SYNC | INACT | — |
| | | DATA V SYNCHRONIZATION COMPLETED | | |
| h | ACT | SYNC | ACT | SYNC |
| | | | RESTART I/O TO SECONDARY V | |
| i | ACT | — | ACT | SYNC |

US 7,360,047 B2

STORAGE SYSTEM, REDUNDANCY CONTROL METHOD, AND PROGRAM

CROSS-REFERENCE TO RELATED APPLICATION

The present application claims priority from Japanese Patent Application No. JP 2005-273474 filed on Sep. 21, 2005, the content of which is hereby incorporated by reference into this application.

TECHNICAL FIELD OF THE INVENTION

The present invention relates to a technology for a storage apparatus (also referred to as disk array apparatus) with a RAID function, which inputs and outputs (I/O) data to and from a storage area (volume) on a storage device such as a hard disk drive (HDD), and more broadly, to a technology for a storage control system. More particularly, the present invention relates to a technology for a storage system in which a process of redundant writing (also referred to as doubling) of data from the host computer to redundant storage apparatus and control (also referred to as redundancy control) including return to a redundant state by synchronizing redundant data volumes are performed.

BACKGROUND OF THE INVENTION

In a conventional technology, in a storage system in which a computer serving as a host and two storage apparatuses each having a RAID function are communicably connected to each other, a process and function of data redundant writing (doubling) from a host are achieved. In the redundant writing, the same data is written from the host into the storage volumes (referred to as first and second volumes) of the two storage apparatuses (referred to as first and second storage apparatuses). By doing so, a state where data is doubled (duplicated) can be maintained.

In the storage system, such a redundant writing function from the host contributes to data redundancy and improvement in reliability, which is and will be an effective function.

As the redundant writing function associated with the functions of the storage apparatus and the storage system, for example, a function of automatic return to a redundant writing state from a failed state has not been provided.

In the above-mentioned storage system, a redundant state may be changed to a non-redundant state due to a failure or the like in one of two data I/O systems (hereinafter referred to as first (primary) and second (secondary) systems) in which the redundant writing is performed. The redundant state is a state where the data contents of the first and second volumes are approximately identical to each other and are synchronized with each other. The non-redundant state (in other words, a single state) is a state where the data contents of the first and second volumes are different from each other and are not synchronized with each other.

In the control of the redundant writing, when the state is changed from the redundant state to the non-redundant state, it is necessary to return the state to the redundant state through some procedure. In the non-redundant state, a difference occurs between the data contents of the first and second volumes. Therefore, concurrently with recovery of the failed portion, a process of synchronizing the data contents of the first and second volumes is required.

Japanese Patent Laid-Open Publication No. 7-36629 (Patent Document 1) discloses a recovery processing method for failure recovery at the time of occurrence of a failure in redundant disk devices.

SUMMARY OF THE INVENTION

In the return to the redundant state (hereinafter referred to as return to redundancy), a manual operation via the host has to be involved until it is recovered to the redundant state where an online task with redundant writing can be carried out. Particularly, volume data has to be transferred (copied) via the host from the target volume (normal volume) of the storage apparatus of the normal system to the target volume (volume to be recovered) of the storage apparatus of the system to be recovered. As a result, data of the target volume to be recovered is synchronized with that of the normal volume.

Conventionally, in the data transfer for the return described above, the entire storage area data of the target large-capacity storage device at the normal side has to be copied from the host through communication connection. Particularly, the host has to stop the normal task to allow the copying process task via the host. In this method, since the task is performed via the host, there is a problem such that load on the host and trouble for the user performing the task are large and thus the entire efficiency is not satisfactory.

The present invention has been made in view of the above problem, and an object of the present invention is to provide a technology capable of achieving the control including efficient return to redundancy with reduced load on a host and trouble for a user in a storage system allowing redundant writing.

Typical aspects of the present invention disclosed in this application are briefly described as follows. For the achievement of the above-mentioned object, the present invention provides a technology for a storage system including first and second storage apparatuses each including a storage control device (DKC) and a storage device (HDD or the like) and having a RAID function, and a host computer for inputting/outputting data to/from storage areas (volumes) of the storage apparatuses, and it includes the following technical means.

This system has a configuration which can perform the data redundant writing (doubling) to the first and second storage apparatuses from the host computer via communication means. The first and second storage apparatuses have data volumes for the redundant writing (first and second volumes). The system has a data I/O system including a path from the host computer to the first volume (first system) and a data I/O system similarly including a path from the host computer to the second volume (second system).

This system performs the redundancy control which includes the control of a redundant state where the data contents of the first and second volumes including redundant writing from the host computer to the first and second volumes are synchronized, and the control of return from a state where the data contents of the first and second volumes are not synchronized with each other due to a failure or the like (non-redundant state) to the redundant state by synchronizing the data contents of the first and second volumes.

In this system, programs interrelated to each other for achieving the method and process of the redundancy control in the host computer and the first and second storage apparatuses are executed by a processor. Details of an example are as follows.

(1) This storage system has first to fourth means that perform the processes as follows.

The first is the means (corresponding to doubling unit and JNL retaining unit in the embodiments) which allows the first and second storage apparatuses to perform an update I/O process to their own volumes in response to an update I/O request constituting the I/O for the redundant writing from the host computer at the time of the redundant writing, and also to retain information about the update IO (command, address, update data, and others) as first and second update history information (journal) in their own storage apparatuses, that is, sequentially store the information in an update order.

The second is the means (corresponding to inter-storage communicating unit and synchronization point detecting unit) which allows the first and second storage apparatuses to communicate with each other regarding the contents of the first and second journals not through the host computer to check and confirm a part of the journal of the storage apparatus of the normal one of the systems, that is, retained data after the latest synchronization point required for synchronization of the data contents of the first and second volumes (data retained in only one of the systems) and then copy and transfer the data to the storage apparatus of the other system to be recovered, thereby coinciding (synchronizing) the contents of the first and second journals, when one of the first and second systems for redundant writing is in an I/O-impossible (abnormal) state, that is, in a non-redundant state (in other words, in a single state where synchronization of the data contents of the first and second volumes is not ensured) and therefore the state is to be returned from the non-redundant state to the redundant state where redundant writing is possible by coinciding (synchronizing) the data contents of the first and second volumes. The synchronization point is a point of time and position where synchronization of the data contents of the first and second systems is ensured.

The third is the means (restoring unit) which allows the storage apparatus of the system to be recovered to reflect the update I/O information equivalent to the updated data onto its own volume based on the data of the journal obtained through communication and transfer between the storage apparatuses to synchronize the data contents of the first and second volumes.

The fourth is the means (host I/F control unit or synchronization point detecting unit) which allows the first and second storage apparatuses and the host computer to report the information about the states of the storage apparatuses, that is, the state information including a state of the operation of the volumes and a state regarding the copying process.

With these processes, in the system including the host computer and the volumes of the storage apparatuses, when a non-redundant state occurs due to a failure or the like in one of the systems and then it is to be returned to the redundant state through the recovery of the failed system, data synchronization of the first and second volumes can be performed not through the host computer based on a transfer of necessary journal data between the first and second storage apparatuses, thereby achieving the return to the redundant state.

Also, for example, the host computer and the first storage apparatus are connected to each other by a first communication link, the host computer and the second storage apparatus are connected to each other by a second communication link, and the first and second storage apparatuses are connected to each other by a third communication link.

Furthermore, the recovery of the failed system is performed by the recovering means independent from the means that performs the above processes.

(2) This system further includes: means (marker writing unit, JNL retaining unit, etc.) which allows the host computer to write the information (synchronization marker) for identifying a synchronization point in data redundancy in the first and second volumes into the first and second journals of the first and second storage apparatuses at an appropriate timing such as at each predetermined time and separately from the update I/O; and means (synchronization point detecting unit) which detects the latest synchronization point by reading the synchronization marker stored in the first and second journals through the communication between the first and second storage apparatuses so as to determine the data transferred between the first and second storage apparatuses. The synchronization marker includes, for example, a number and time information that can identify a chronological order. When the same synchronization marker can be found in the journals of the first and second systems, the marker position indicates the synchronization point, and regarding the update I/O information stored up to the marker position, data synchronization of the first and second systems is ensured. When a synchronization marker is stored only in the journal of one of the systems, it can be found that the synchronization marker and I/O before and after the synchronization marker are not normally completed due to a failure in the other system. With identification numbers provided to the plurality of markers, the latest synchronization point can be detected. Basically, the same marker is simultaneously written in the first and second journals (but the marker is not written in the journal of the failed system). The update I/O information data required for synchronization can be determined based on the latest synchronization marker written in both of the first and second journals.

(3) This system further includes: means which performs an instruction for synchronization of the data contents of the volumes (synchronization instruction) from the host computer to the storage apparatus of the normal system. The storage apparatus receiving the instruction performs a process of synchronizing the first and second volumes between the first and second storage apparatuses. Through communication between the host computer and each storage apparatus, each storage apparatus transmits a notification (report) that synchronization has been completed or information about the state to the host computer. When receiving the report from both of the storage apparatuses to confirm the completion of synchronization and failure recovery, the host computer returns to the redundant state.

(4) This system further includes: means (doubling means, etc.) which allows return to the redundant state, that is, restart of redundant writing when the host computer receives and confirms the notification (report) that synchronization of the data contents of the first and second volumes has been completed from both of the first and second storage apparatuses, and which repeats similar processes (synchronization and confirmation) until receiving and confirming the notification from both of the systems when the host computer cannot receive the notification from both of the systems even after a lapse of a predetermined time.

For example, after synchronization of the volumes is completed, each of the first and second storage apparatuses issues a completion notification indicating that the synchronization has been completed to the host computer. When confirming the completion notification from both of the first and second storage apparatuses, the host computer allows return to the redundant state. If the completion notification cannot be confirmed even after a lapse of the predetermined time, the host computer returns to processes such as the synchronization instruction, and repeats the similar processes until the confirmation is obtained from both of the systems.

(5) Furthermore, for example, in order to check whether the synchronization has been completed after the synchronization instruction, the host computer issues a request for checking the states of the storage apparatus including the states of the volumes to each of the first and second storage apparatuses at each predetermined timing. In response to the request, each of the first and second storage apparatuses reports the information about the state of storage apparatus itself. When confirming the report of the information about the state indicating that the synchronization has been completed from both of the first and second storage apparatuses, the host computer allows return to the redundant state. If the report cannot be confirmed from both of the apparatuses after a lapse of the predetermined time, the host computer returns to processes such as the synchronization instruction, and repeats the similar processes until confirmation is obtained from both of the systems.

Other than the above, in the configuration including an external computer that can be communicably accessed from the host computer and the first and second storage apparatuses, the journal may be stored and managed in the external computer, and the first and second storage apparatuses may access the journal in the external computer as required for use.

(6) Still further, this redundancy control method is a method in which the redundant writing (redundant I/O) of data is performed from a host computer into a first volume of a first storage apparatus and a second volume of a second storage apparatus, and the method includes the following steps.

First, a step is provided in which, in a normal state, the first and second storage apparatuses retain an update I/O request constituting the redundant I/O from the host computer as first and second journals, respectively. Second, a step is provided in which, when one of the first and second systems is in an I/O-impossible non-redundant state due to a failure or the like and it is to be returned to the redundant state, an instruction for synchronizing the data contents of the volumes is issued from the host computer to the storage apparatus of the normal system. Third, a step is provided in which, by following the instruction, the first and second storage apparatuses communicate with each other regarding the first and second journals. Fourth, a step is provided in which a part of the journal of the storage apparatus of the normal system, that is, the retained data after the latest synchronization point required for synchronization is copied and transferred to the storage apparatus of the other system to be recovered. Fifth, a step is provided in which the storage apparatus of the system to be recovered reflects the update I/O information equivalent to the updated data onto its own volume based on the data of the journal obtained through transfer between the storage apparatuses to synchronize the data contents of the first and second volumes. Sixth, a step is provided in which each of the first and second storage apparatuses reports state information including a state of the volume of the storage apparatus itself to the host computer. Seventh, a step is provided in which the host computer allows return to the redundant state when confirming that the synchronization has been completed through communication from both of the first and second storage apparatuses, and if confirmation is not obtained from both of the systems after a lapse of a predetermined time, the host computer repeats similar processes (second to sixth steps described above) until the confirmation is obtained from both of the systems and retries synchronization and confirmation. By following these steps, synchronization and confirmation of the first and second volumes are performed between the storage apparatuses not through the host computer, and the return to the redundant state can be achieved.

Effects obtained by typical aspects of the present invention are briefly described below. According to the present invention, under a redundant writing environment, during the return to redundancy, the conventional data copying between the first and second storage apparatuses through the host and a halt of a normal task at the time of copying can be minimized. Therefore, the load on the host and trouble for the user can be reduced and the efficiency of the entire processing can be improved.

BRIEF DESCRIPTIONS OF THE DRAWINGS

Figure 4:
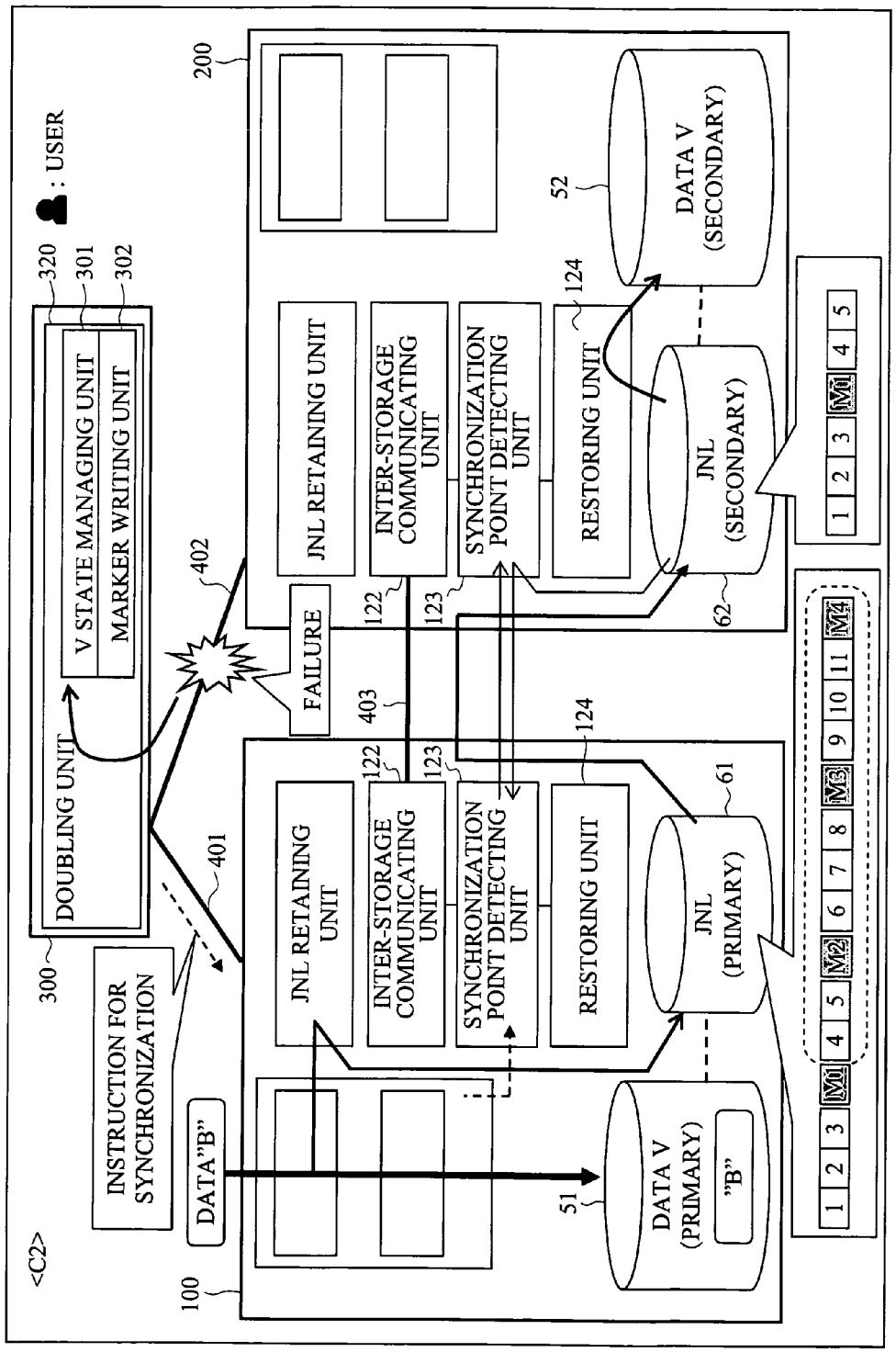
Figure 5:
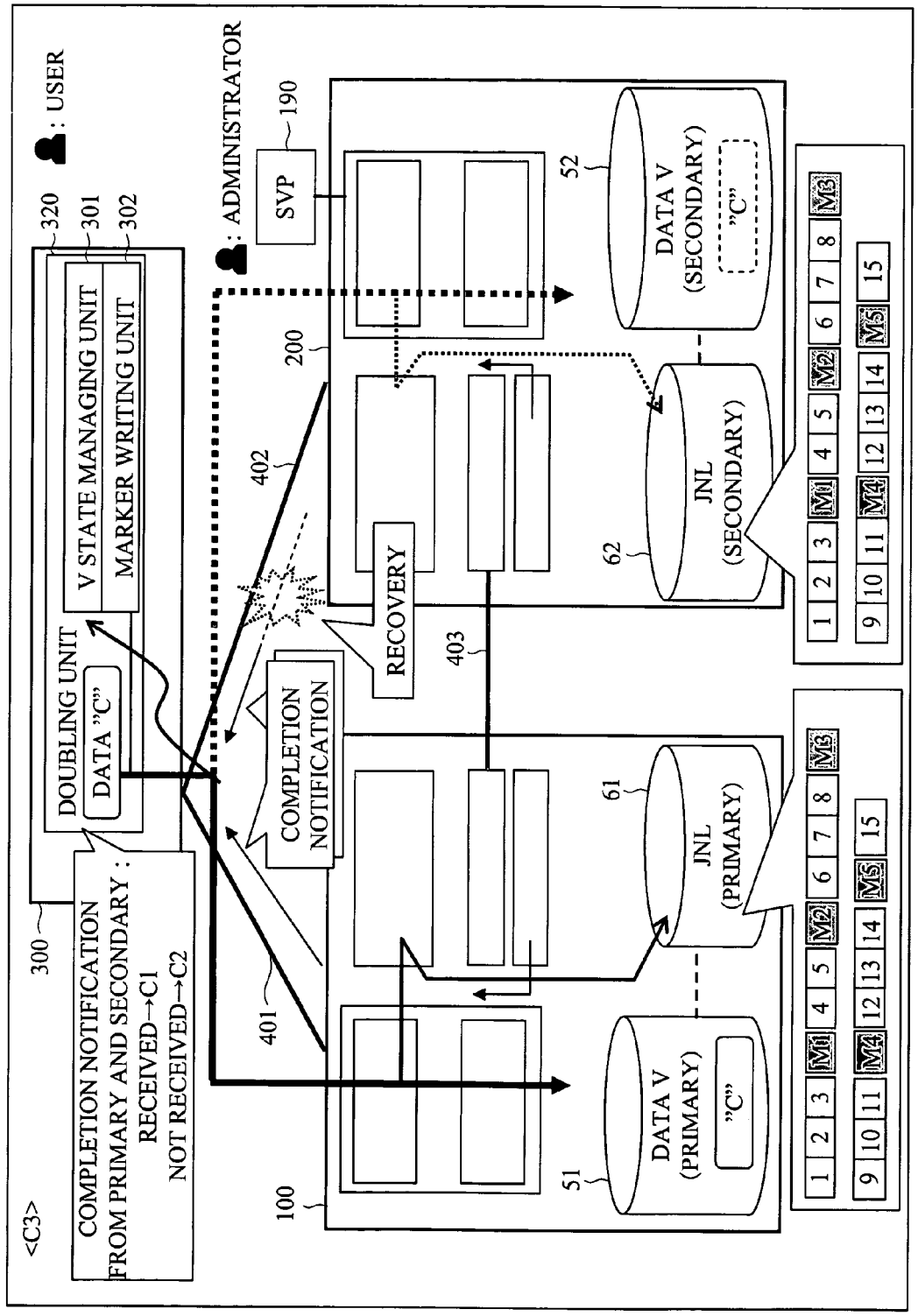
Figure 6:
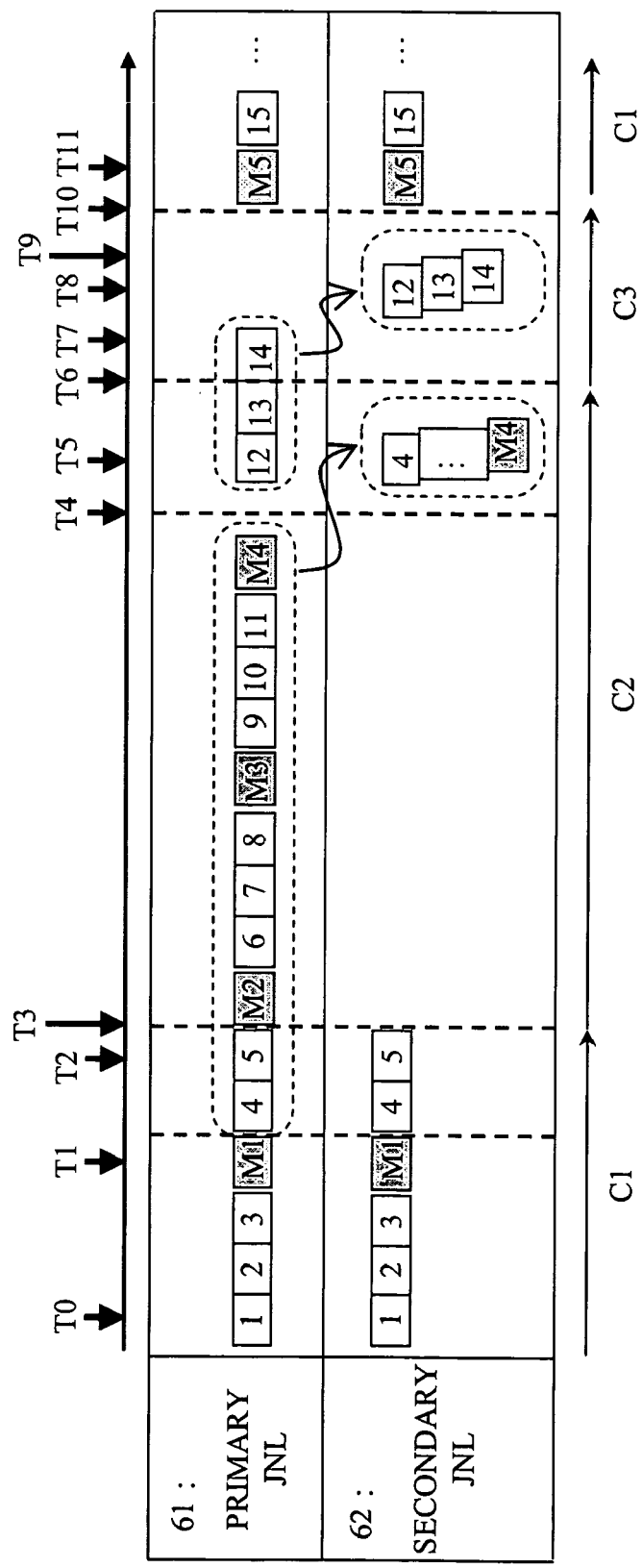
Figure 8:
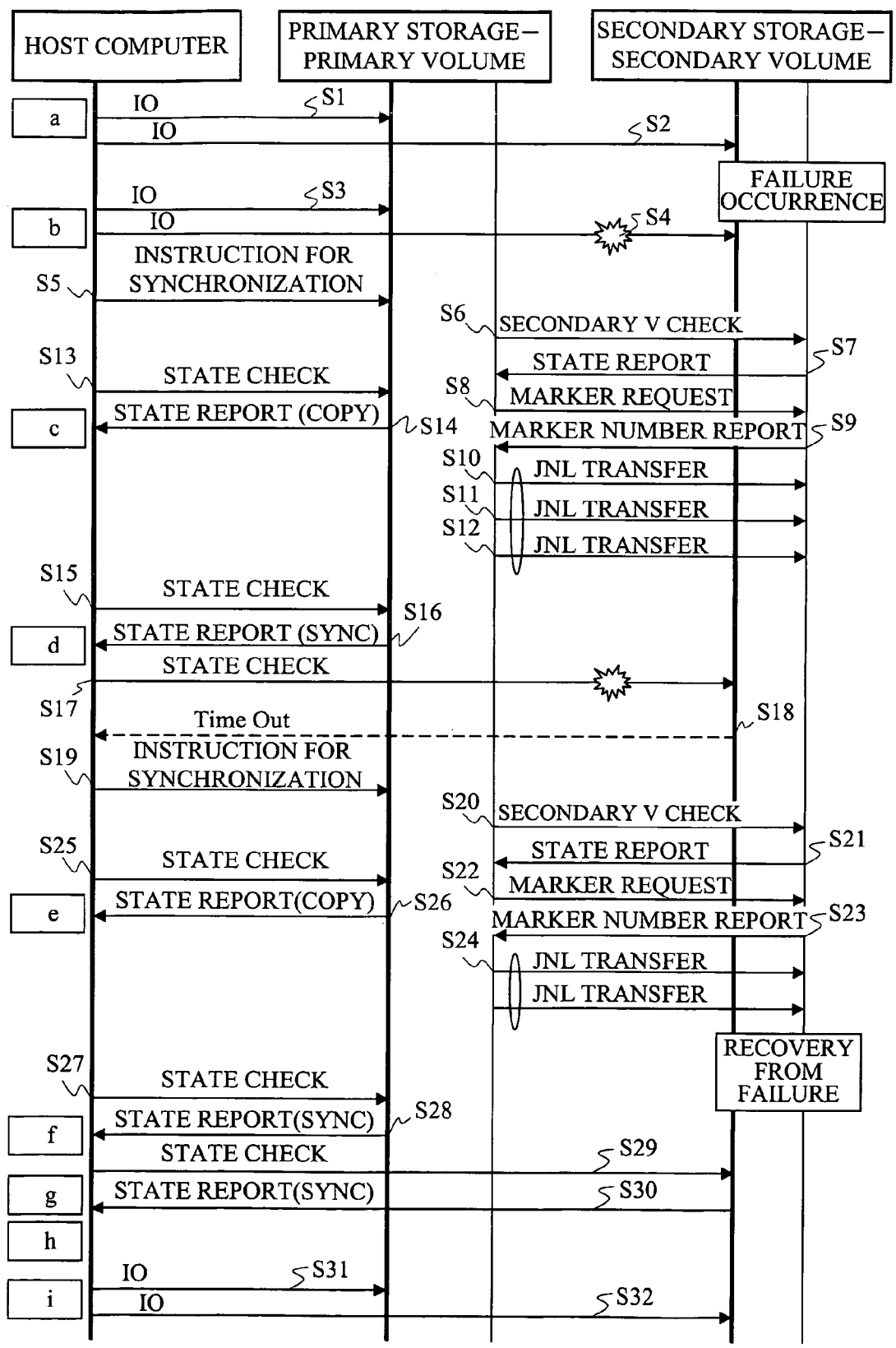
Figure 9:
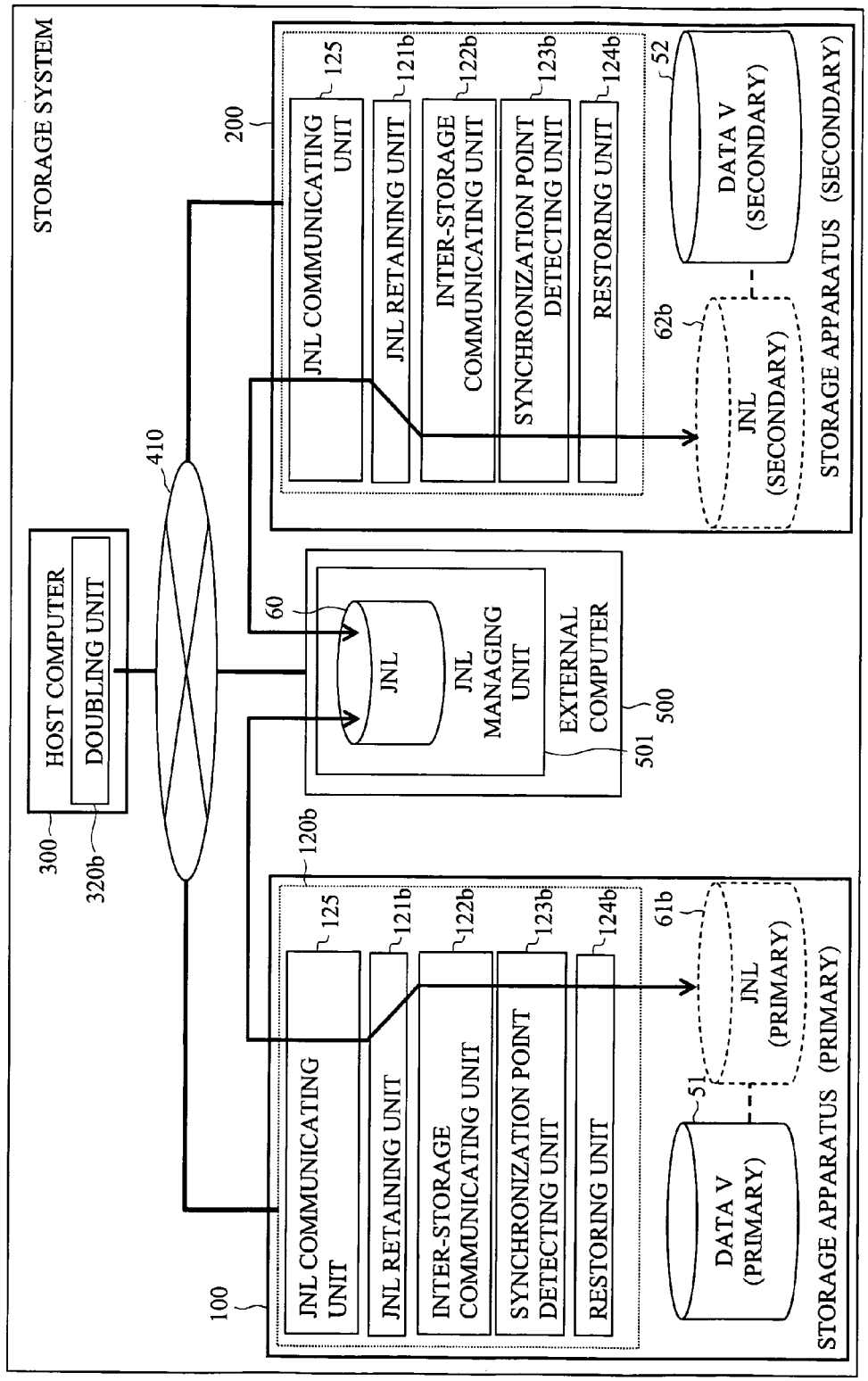

FIG. 4 is a drawing that depicts another example of the redundancy control flow and the journal state in accordance with the redundancy control method in the storage system according to the first embodiment of the present invention, in which a state where the occurrence of a failure is detected in one of the primary and secondary systems and an instruction for redundancy synchronization is to be issued (C2) is shown;

FIG. 5 is a drawing that depicts still another example of the redundancy control flow and the journal state in accordance with the redundancy control method in the storage system according to the first embodiment of the present invention, in which a state at recovery and non-recovery at the time of return to redundancy (C3) is shown;

FIG. 6 is a drawing that depicts an example of transitions of the contents of primary and secondary journals in an example of a process in the storage system according to the first embodiment of the present invention;

FIG. 7 is a drawing that depicts an example of V state management information managed by a V state managing unit and transitions of related operation states in an example of the process in the storage system according to the first embodiment of the present invention;

FIG. 8 is a drawing that depicts an example of a sequence of the entire process among the host and the primary and secondary storage apparatuses in an example of the process in the storage system according to the first embodiment of the present invention; and FIG. 9 is a drawing that depicts the configuration of a storage system according to a second embodiment of the present invention, particularly showing the configuration of blocks required for redundancy control.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted. FIG. 1 to FIG. 9 are drawings used to describe the embodiments of the present invention.

First Embodiment

In the first embodiment, in brief, as a redundancy control method in a storage system, a journal including update data and a synchronization marker is stored from a host into primary and secondary storage apparatuses for redundant writing. At the time of return to redundancy, the storage apparatuses directly communicate with each other upon instruction from the host to transfer necessary journal data, and the target volume is restored based on the transferred data. By doing so, data is synchronized between the primary and the secondary. Upon reception of a notification indicating the completion of data synchronization from the primary and secondary systems, the host restarts redundant writing. If such completion notifications from both of the systems cannot be confirmed, the host issues an instruction again to repeat synchronization.

Storage System

Figure 1:
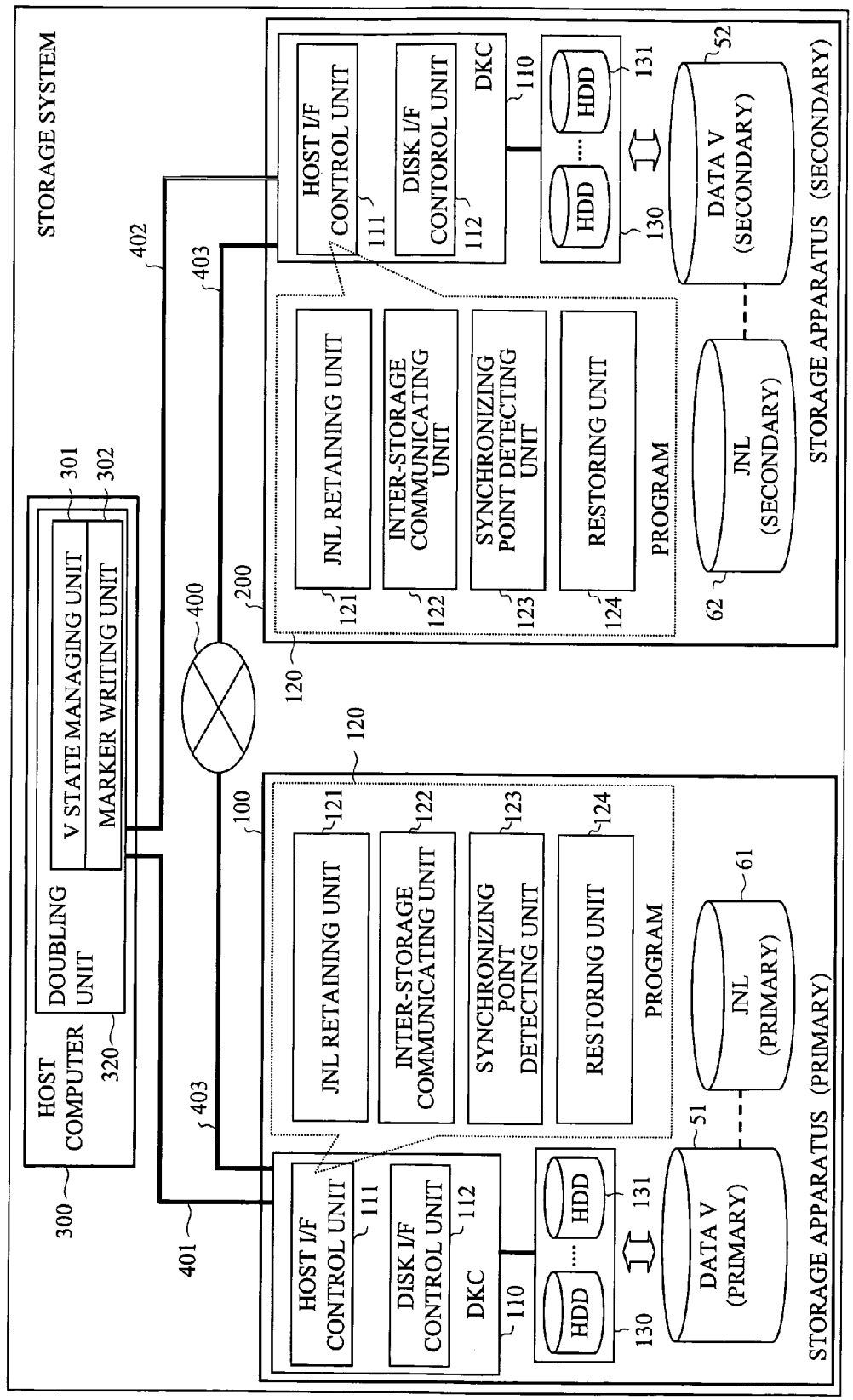
FIG. 1 is a drawing of the configuration of a storage system according to a first embodiment of the present invention, particularly showing the configuration of blocks required for redundancy control.

FIG. 1 depicts the configuration of a storage system according to the first embodiment of the present invention, particularly showing the blocks required for redundancy control.

The storage system includes a host computer (hereinafter abbreviated as a host) 300, a first storage apparatus (100), and a second storage apparatus (200) which are connected via communication means. The host 300 and the first storage apparatus 100 are connected to each other by a communication link 401, whilst the host 300 and the second storage apparatus 200 are connected to each other by a communication link 402. Also, the storage apparatus 100 and the storage apparatus 200 are connected to each other by a communication link 403 via a network 400.

With regard to the function and configuration of redundant writing, the first storage apparatus 100 is a primary storage apparatus having a primary volume (51), and in relation to that, the second storage apparatus 200 is a secondary storage apparatus having a secondary volume (52). Note that it is assumed that the first storage apparatus 100 and the second storage apparatus 200 are storage apparatuses basically having the same function, but may be those of different types.

It is also assumed that the communication links (401, 402, 403) among the host and the storage apparatuses (100, 200, 300) are independent from one another, and redundant input/output (I/O), journal (JNL) transfer and others are performed independently. A communication processing unit of the host 300 and a host interface (I/F) control unit 111 of the first storage apparatus 100 are connected to each other by the communication link 401. Similarly, the communication processing unit of the host 300 and a host interface (I/F) control unit 111 of the second storage apparatus 200 are connected to each other by the communication link 402. Note that the communication connection among them may take another form such that, for example, they are interconnected on one network such as a storage area network (SAN).

The host 300 is an information processing unit such as a personal computer (PC), a server, or a main frame computer. By executing a program on a processor included in the host 300, the function of the host 300 is achieved. The host 300 has a doubling unit 320 for achieving redundancy control. The doubling unit 320 includes a V (volume) state managing unit 301 and a marker writing unit 302.

Each of the storage apparatuses (100, 200) broadly includes a disk controller (DKC) 110 and a disk unit (DKU) 130. A data volume (V) and a journal (JNL) are retained in each of the storage apparatuses (100, 200).

The DKC 110 is connected to the DKU 130 and is communicably connected to each HDD 131 in the DKU 130. The DKC 110 is communicably connected to the external host 300, a DKC 110 of another storage apparatus (200), and other information processing units. The DKC 110 is a storage control device for control of data I/O from the host 300 to the storage volume including the control of the DKU 130. The DKC 110 can read and write data from and to the storage volume on any of the HDDs 131 of the DKU 130, and also can set a predetermined RAID level to the group of the HDDs 131 for RAID control. The DKU 130 has a plurality of storage devices such as the HDDs 131 internally connected thereto. Note that the configuration in which an external storage device other than the DKU 130 is connected to the DKC 110 which controls the storage device is also preferable.

The DKC 110 is composed of processing units including the host I/F control unit 111 and a disk I/F control unit 112. The host I/F control unit 111 controls a communication process with the host 300. The disk I/F control unit 112 controls a communication process with the HDDs 131 of the DKU 130. The DKC 110 also includes a memory unit for storing I/O data, control information, and others and a connecting unit for performing a data transfer process among the processing units.

In the host I/F control unit 111, a program 120 associated with the process of the redundancy control method is executed. Each of the storage apparatuses (100, 200) has the program 120, and both programs are similar to and compatible with each other. Processing units achieved by the program 120 include a JNL retaining unit 121, an inter-storage communicating unit 122, a synchronization point detecting unit (synchronization processing unit) 123, and a restoring unit 124.

In this embodiment, a process associated with the redundancy control method is achieved by the host I/F control unit 111 executing the program 120 on the storage apparatus side. Alternatively, similar processing functions may be implemented by software or hardware at another portion in each storage apparatus.

A logical volume allocated in the DKU 130 of the first storage apparatus 100 has a first data V 51 and a first JNL 61 associated with the first data V 51. In relation to this, a logical volume allocated in the DKU 130 of the second storage apparatus 200 has a second data V 52 and a second JNL 62 associated with the second data V 52. The first data V 51 is also referred to as a primary volume, whilst the second data V 52 is also referred to as a secondary volume. The first JNL 61 is also referred to as a primary journal, whilst the second journal 62 is also referred to as a secondary journal.

The data Vs (51, 52) are volumes to which the data I/O in redundant I/O from the host 300 is performed. The JNLs (61, 62) are update data history information about the associated data Vs (51, 52). In the first embodiment, similar to the data Vs (51, 52), each of the JNLs (61, 62) is retained in a form of a logical volume in the DKU 130.

The JNL retaining unit 121 performs processes of retaining and updating the JNL (61, 62) in its own storage apparatus and manages the JNL. The JNL retaining unit 121 writes update data and a synchronization marker from the host 300 in the JNL (61, 62) in its own storage apparatus.

The inter-storage communicating unit 122 performs a direct communication process between the storage apparatuses (100, 200) through the communication link 403. The inter-storage communicating unit 122 may includes, for example, a remote copy function for controlling remote copy between logical volumes.

The synchronization point detecting unit 123 relates to the data V (51 or 52) and the JNL (61, 62) and manages a synchronization process including a process of detecting a data synchronization point.

The restoring unit 124 performs a process of restoring the data V (51, 52) by using data of the JNL (61, 62) in its own storage apparatus.

In a synchronization process for return to redundancy in the first embodiment, JNL synchronization is performed by the synchronization point detecting unit 123 and the inter-storage communicating unit 122, and then, data V synchronization is performed by the restoring unit 124.

Also, the host I/F control unit 111 performs a process of transmitting and receiving an instruction for redundancy control and a report about a V state to and from the host 300.

The V state managing unit 301 of the host 300 is involved in redundancy control and manages the state of each of the data Vs (51, 52) of the storage apparatuses (100, 200) to which the redundant writing is performed.

Also, the marker writing unit 302 performs a process of writing a synchronization marker on each of the JNLs (61, 62) in association with data I/O for redundant writing, in other words, a process of transmitting update data of redundant I/O together with a synchronization marker in order to write the synchronization marker.

Figure 2:
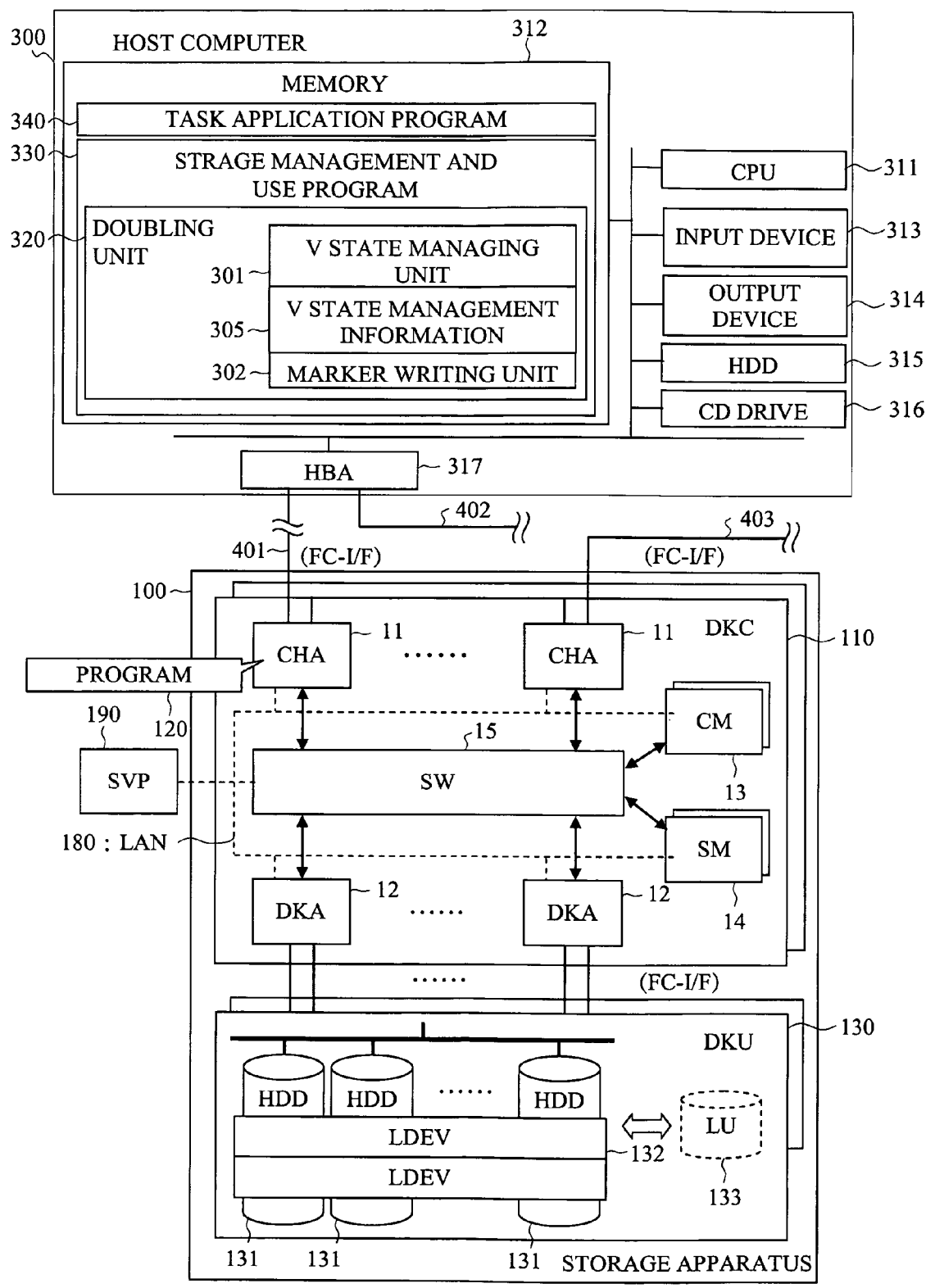
FIG. 2 is a drawing of the configuration of the storage system according to a first embodiment of the present invention, particularly showing an example of a hardware configuration of a host and a storage apparatus.

FIG. 2 depicts the configuration of the storage system according to the first embodiment of the present invention, particularly showing an example of the hardware configuration of the host 300 and the storage apparatus 100. The host 300 and the storage apparatus 100 are connected to each other by a predetermined corresponding I/F. Also, the first and second storage apparatuses (100, 200) are connected to each other by a predetermined corresponding I/F. Furthermore, the DKC 110 and the HDDs 131 are connected to one another by a predetermined corresponding I/F. In this example, these components are connected by a fiber channel (hereinafter abbreviated as FC) I/F, but another I/F may be used.

Host Computer

The host 300 includes a CPU 311, a memory 312, an input device 313 such as a keyboard or a mouse, an output device 314 such as a display, an HDD 315 and a CD drive 316 that serve as auxiliary storage devices, an host bus adaptor (HBA) 317 serving as a communication processing unit, and others. The CPU 311 executes various programs on the memory 312. The host 300 has a task application program 340 and a storage management and use program 330 on the memory 312.

The task application program 340 is a program for providing an information processing service (task process) by using data I/O for the storage apparatuses (100, 200) by the storage management and use program 330. The task application program 340 performs a task process in a normal state. The host 300 can be communicably connected to a client device such as a PC to also serve as a server for providing a service.

The storage management and use program 330 is a program for storage use and management including data I/O for the storage apparatuses (100, 200). In this embodiment, the storage management and use program 330 includes the doubling unit 320. The doubling unit 320 is a part of the program for providing a process for redundancy control including redundant writing and return to redundancy and a user I/F for the redundancy control. The doubling unit 320 includes the V state managing unit 301 and the marker writing unit 302. The V state managing unit 301 manages V state management information 305 as shown in FIG. 7. The data Vs (51, 52) and others for redundancy can be set through the doubling unit 320.

The HBA 317 is a communication processing device having a plurality of FC-I/F-compatible ports incorporated therein. For example, the host 300 is connected to the communication links 401 and 402 through each of the ports of the HBA 317.

Storage Apparatus

The storage apparatus 100 can be composed of, for example, a basic chassis and an additional chassis not shown. The basic chassis is a minimum configuration unit and is provided with a storage control function implemented by the DKC 110 and a storage function implemented by the DKU 130. The additional chassis is an optional unit and is provided with a storage function. These chassis are communicably connected together via a communication cable.

The basic chassis is provided with, although not shown, a power supply unit such as a battery, an AC box and an AC-DC power supply, a DKC box, a DKU box, a service processor (SVP) 190, an operation panel, fans, and others.

The battery is connected to the AC-DC power supply to function as a backup power supply at the time of a power blackout. The AC box has an input AC power supply connected thereto and is connected to the AC-DC power supply. The AC-DC power supply performs AC-DC conversion on the input AC power supply and supplies DC power to each component such as the DKC 110.

The DKC box has a configuration including a plurality of slots into which control packages constituting the DKC 110 can be inserted. The control packages are removably inserted into the respective slots and can be replaced in units of packages. In the DKC box, a backplane board for the mutual connection of packages is provided, and each package is connected to the backplane board via connectors. The HDDs 131 constituting the DKU 130 are detachably connected to the DKU box. On the above-mentioned operation panel, switches for basic operation of the device and a display for showing various pieces of information are disposed. The plurality of fans are used for the air cooling by sending air to the components inside the chassis.

The DKC 110 includes disk adaptors (DKAs) 12 to which the HDDs 131 in the DKU 130 are communicably connected via a connection network. Each HDD 131 performs an operation of data reading and writing to and from its own disk area in response to a request from the DKA 12 side. A storage area unit in the HDD 131 is, for example, a block unit corresponding to a logical block address (LBA). As the HDD 131, a drive of various types of I/Fs can be used, and the HDD 131 is accessed by the DKA 12 of the corresponding I/F. In the DKU 130, the plurality of HDDs 131 are connected to one another by, for example, Fibre Channel-Arbitrated Loop (FC-AL).

The storage apparatus 100 generally adopts a cluster configuration for the purpose of improving availability. For example, the DKC 110 is configured as a redundant control cluster together with the power supply unit. Even if one cluster goes down due to a failure or the like, service can be continuously provided through the continuous operation of the other normal cluster.

In this example, as processing units for the control packages, the DKC 110 has channel adaptors (CHAs) 11, the disk adaptors (DKAs) 12, a cache memory (CM) 13, a shared memory (SM) 14, and a crossbar switch (SW) 15. The components 11 to 14 are connected via the SW 15 so as to mutually communicate with one another and transfer data.

The CHAs 11 perform the channel I/F control to an external device. The above-mentioned host I/F control unit 111 is associated with the function of the CHA 11. The DKAs 12 perform the disk I/F control to the HDDs 131. The disk I/F control unit 112 is associated with the function of the DKAs 12. The CHAs 11 and the DKAs 12 each includes, for example, a plurality of port units, a microprocessor unit (MPU), a work memory, a program memory, and a direct memory access controller (DMAC), which are not shown. The port units perform a protocol communication process of the corresponding I/F with an external device. The MPU performs control over the port units and the DMAC. The DMAC performs a DMA data transfer process, for example, an I/O data transfer process with the CM 13. In this embodiment, each of the CHAs 11 and the DKAs 12 has one or more MPU incorporated therein, and can execute a process independently.

In this embodiment, redundancy control is possible with the host 300 mainly through control and processing at the CHA 11. The CHA 11 executes the program 120 for redundancy control by the MPU. Note that, in the DKC 110, it is also possible to give the similar function to a processing unit other than the CHA 11.

The CM 13 and the SM 14 are memories shared among the components such as the CHAs 11 in the DKC 110. Here, these memories can be accessed also from other clusters. The CM 13 is used for caching I/O data for the volume. The SM 14 is used for storing control information such as configuration information. Data and information on the CM 13 and the SM 14 are backed up and their contents are retained. States in the storage apparatus 100, for example, the configuration of each component, a failed state, and a processing state are stored and written in and/or read from a memory such as the SM 14 included in the DKC 110 as information or data.

The SW 15 is a connection network for data transfer by switching among connection paths among the respective components such as the CHAs 11, the DKAs 12, the CM 13, and the SM 14. In each path, a logical path is set on a physical line (bus) according to need. Regarding data I/O, a data I/O system including a path from the host 300 to the data V 51 and the JNL 61 is set and allocated in the primary storage apparatus 100 (hereinafter referred to as a primary system), whilst a data I/O system including a path from the host 300 to the data V 52 and the JNL 62 is set and allocated in the secondary storage apparatus 200 (hereinafter referred to as a secondary system).

In the DKU 130, the storage volume indicates a storage resource for storing data, which includes a physical volume which is a physical storage area typified by the HDDs 131 and a logical volume which is a storage area logically set on the physical volume. The logical volume for data I/O is associated with, for example, a logical unit (LU) 133. The LU 133 is a storage area associated with one of logical devices (LDEV) 132. Each LDEV 132 is a storage area that is set on a group (disk array) of the physical volumes (HDDs) 131 and serves as a unit of RAID control. A storage area accessible from the host 300 can be provided as a RAID group managed through RAID control. The host 300 specifies identification information such as a logical unit number (LUN) or a LBA to access a target volume.

In the FC-I/F and protocol, access and data transfer in units of blocks having a predetermined size is performed between the HBA 317 and the CHA 11, between the CHAs 11, and the like. Data of the data V (51, 52) and the JNL (61, 62) is divided and proceeded in accordance with a lower protocol.

SVP

The DKC 110 of each of the storage apparatus 100 and the storage apparatus 200 has the SVP 190 connected thereto through an internal LAN 180. The SVP 190 connected to the storage apparatus 100 will be described as an example. The SVP 190 is an information processing unit having functions of maintenance and management of the storage apparatus 100, and has a processor for executing a program for maintenance and management processes and a memory. The SVP 190 provides a GUI corresponding to those functions. For example, the SVP 190 has a configuration in a form of a general note PC. The SVP 190 can communicate with each component such as the CHA 11 through the LAN 180. The program 120 for use in the DKC 110 is downloaded from, for example, the SVP 190 through the LAN 180 to the memory in the CHA 11, and is then executable by the MPU.

The maintenance and management processes of the SVP 190 include an automatic support process and an information process for various tasks by an administrator who operates the SVP 190 when the system including the host 300 and storage apparatus 100 is in a state where data I/O cannot be performed due to the failure or the like. For example, when the communication link 402 of the secondary system is failed, the administrator specifies a failure cause through the function of the SVP 190 or the maintenance and management functions included in the host 300, and then recovers the failed portion through the tasks including a task of replacing the physically failed portion (for example, communication cable).

Also, the configuration in which the SVP 190 or another device for maintenance and management is communicably connected outside the storage apparatus 100 is also preferable. For example, a program for maintenance and management can be installed in the host 300 for use.

The SVP 190 manages various information of the storage apparatus 100 through maintenance and management processes, thereby referring to/acquiring/updating the information on the SM 14. By the operation of the SVP 190 by the administrator, the processes for the setting and confirmation of the configuration of the physical disk, the LU 133, the RAID level, and others, installation of a program to be executed on the CHA 11, and analysis and recovery at the time of a failure can be performed through a GUI display on a display screen.

Note that, in this embodiment, although the administrator carries out a failure recovery task by using the SVP 190, means for such recovery is not particularly restricted. Also, a process for return to redundancy is performed mainly by the host 300 separately from failure recovery.

Normal Data I/O Process

Two I/Os constituting the redundant I/O from the host computer 300 are processed in a manner almost similar to that for the normal data I/O. A normal data I/O process in each of the storage apparatuses (100, 200) exemplarily proceeds as follows. Here, a data Write/Read process on the data volume 51 in the storage apparatus 100 in response to a Write/Read request from the host computer 300 will be described. In the DKC 110, a data transfer process is performed between the CHA 11 and the DKA 12 via the SW while a process instruction is stored in the SM 14 and data is cached in the CM 13.

A write process is as follows. When a data I/O request received by one CHA 11 from the host computer 300 is a write request, the CHA 11 writes the write request in the SM 14 and also writes the write data received from the host computer 300 in the CM 13. On the other hand, the DKA 12 is monitoring the SM 14, and when detecting that a write request has been written in the SM 14, it reads the write data from the CM 13 in accordance with the write request and then writes the read data in the target HDD 131.

A read process is as follows. When a data I/O request received by one CHA 11 from the host computer 300 is a read request, the CHA 11 checks whether data to be read is present in the CM 13. If the data to be read is present in the CM 13, the CHA 11 transmits the data to the host computer 300. On the other hand, if the data to be read is not present in the CM 13, the CHA 11 writes the read request in the SM 14 and also monitors the SM 14. When detecting that the read request has been written in the SM 14, the DKA 12 reads the data to be read from the target HDD 131 and writes the data in the SM 14. Then, when detecting that the data to be read has been written in the CM 13, the CHA 11 transmits the data to the host computer 300.

The DKC 110 can have another configuration. In addition to the configuration in which a process instruction between the CHA 11 and the DKA 12 is made indirectly via the SM 14, the configuration in which a process instruction between the CHA 11 and the DKA 12 is directly made is available. The configuration of a processing unit having the both functions of the CHA 11 and the DKA 12 is also available. Furthermore, the configuration in which memories such as the CM 13 are provided so as to be distributed in each processing unit such as the CHA 11 and the memory configuration in which the CM 13 and the SM 14 are integrated are also available. Still further, the configuration in which the CHA 11 and the DKA 12 are directly connected to each other without the SW 15 and the configuration in which the CHA 11 and the like are controlled mainly by the CPU are also available.

Redundancy Control

Figure 3:
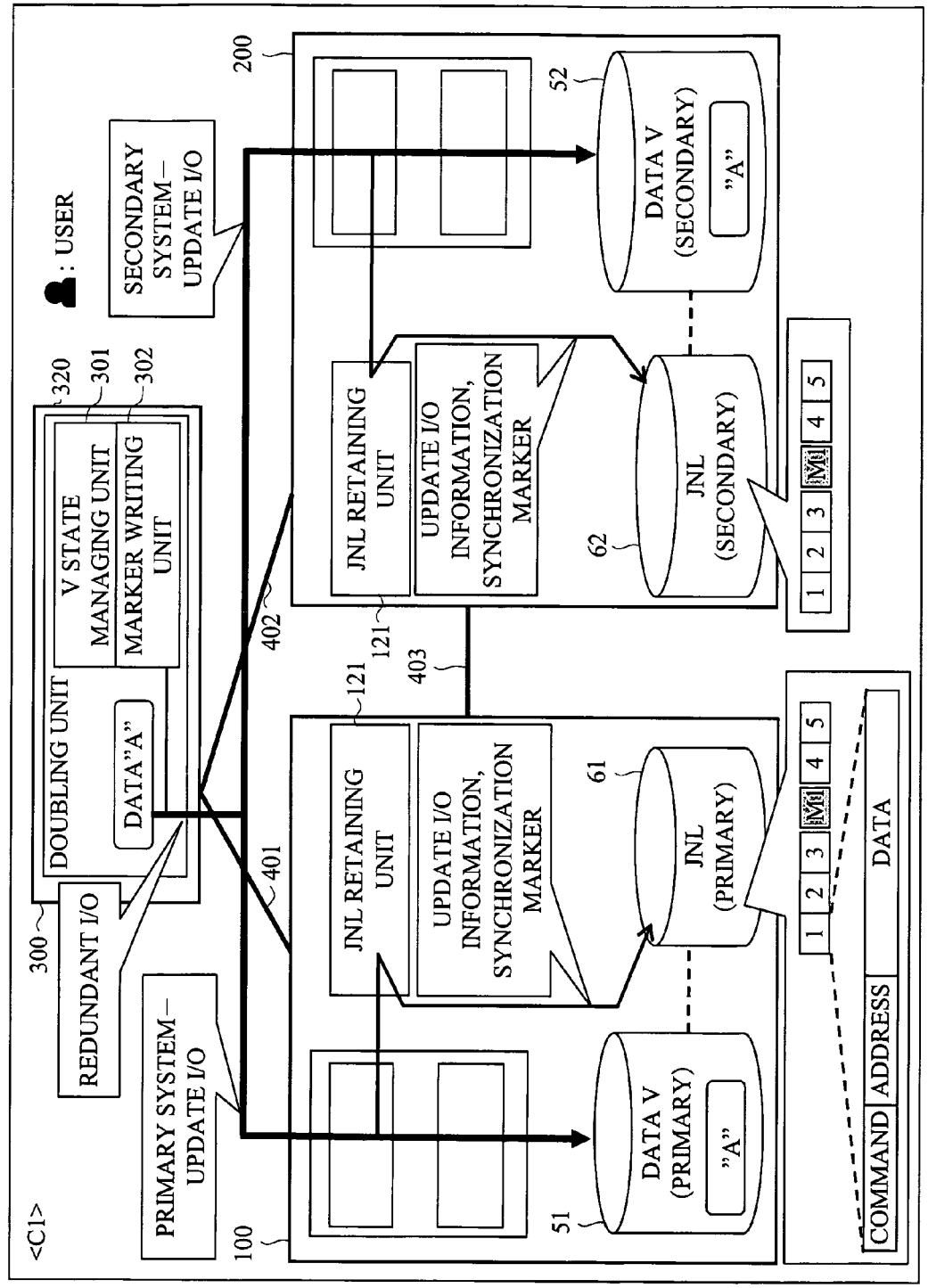
FIG. 3 is a drawing that depicts an example of a redundancy control flow and a journal state in accordance with a redundancy control method in the storage system according to the first embodiment of the present invention, in which a state where two systems of primary and secondary systems for redundant writing are normal (C1) is shown.

Next, redundancy control on the above-described storage system configuration will be described. FIG. 3 to FIG. 5 depict the examples of a redundancy control flow and a journal state in accordance with the redundancy control method in the storage system according to this embodiment. FIG. 3 shows a state where the two systems to be the primary and the secondary for redundant writing are normal (such a state is denoted as C1). FIG. 4 shows a state where the occurrence of a failure is detected in one of the primary and secondary systems and an instruction for redundancy synchronization is to be issued (such a state is denoted as C2). For the purpose of description, it is assumed in this example that a failure occurs in the secondary system. FIG. 5 shows a state at recovery and non-recovery at the time of return to redundancy (such a state is denoted as C3).

FIG. 6 depicts an example of transitions of the contents of the primary and secondary JNLs (61, 62). FIG. 7 depicts an example of the V state management information 305 managed by the V state managing unit 301 and transitions of related operation states thereof. FIG. 8 depicts an example of a sequence of the entire process among the host and the primary and secondary storage apparatuses. FIG. 3 to FIG. 8 correspond to one process example.

In this storage system, redundant writing is automatically performed in accordance with the setting of the basic configuration information and the like (C1). The user of the host 300 can automatically cause redundancy control without providing any particular operation input other than settings. Also, when a failure is detected (C2), an instruction for synchronizing the primary and secondary for return to redundancy (synchronization instruction) is provided to the normal system side automatically from the host 300 or through an operation input by the user. Furthermore, upon the detection of a failure, the administrator operates the SVP 190 to perform a task of recovering the failed portion. When the host 300 confirms the synchronization of the data Vs of the primary and secondary systems in accordance with the synchronization instruction from a completion notification from each of the primary and secondary systems (C3), redundant writing is restarted, that is, return to redundancy is completed.

In the normal state (C1), data for redundant writing, for example, "A" is written in the data Vs (51, 52) of the primary and secondary storage apparatuses (100, 200) from the host 300. In the failure state (C2), data for redundant writing, for example, "B" is written only in the data V 51 of the primary storage apparatus 100 from the host 300. At the recovery state (C3), if recovery has been completed, writing data for redundant writing, for example, "C" not only in the primary but also in data V 52 of the secondary storage apparatus 200 is restarted. In a flow of C1 to C3, as shown in FIG. 3 to FIG. 5 and FIG. 6, the contents of the primary and secondary JNLs (61, 62) are changed.

C1: Normal State

First, in FIG. 3, when the primary and secondary systems are both normal (C1), the host 300 carries out redundant I/O (redundant writing) on the primary and secondary data Vs (51, 52). The redundant I/O includes update I/O such as data writing. When the update I/O is received at the storage apparatuses (100, 200), the contents of both the data Vs (51, 52) and the JNLs (61, 62) are updated. In a redundant writing process, for example, the same data is written from the host 300 onto the primary volume 51 and corresponding secondary volume 52 at approximately the same timing.

The host 300 manages the states of the data Vs (51, 52) of the primary and secondary storage apparatuses (100, 200) by the V state managing unit 301 in the manner shown in the V state management information 305 of FIG. 7, which will be described further below.

The host 300 periodically outputs a synchronization marker to the primary and secondary data Vs (51, 52) by the marker writing unit 302 for writing the marker in the primary and secondary JNLs (61, 62). Upon reception of the synchronization marker form the host 300, the host I/F control unit 111 of each of the primary and secondary storage apparatuses (100, 200) writes the synchronization marker in its own JNL (61, 62) through the JNL retaining unit 121 so that the marker is connected to the already-written update I/O information.

The primary and secondary storage apparatuses (100, 200) process the update I/O received from the host 300. The JNL retaining unit 121 retains the update I/O information and the synchronization marker in its own JNL (61, 62).

One unit of the update I/O information in the JNL (61, 62) represents information including a command, an address, and data. That is, when the update I/O is data writing to the data V (51, 52), the update I/O information to be stored in the JNL (61, 62) includes a write command from the host 300, an address and size in the target data V (51, 52) or the like, and write data body. This information may include other information such as writing time information.

C2: Failure-Detected State

Next, in FIG. 4, at the time of occurrence and detection of a failure (C2), I/O in redundant I/O is continued in the primary system, whilst I/O is impossible due to the failure in the secondary system. In this example, the failure occurs and is detected on the communication link 402 of the secondary system. In this state, even if an I/O request to the secondary system of redundancy I/O from the host 300 is executed, the process cannot be normally completed due to the failure. Alternatively, upon recognition of the failure, the host 300 stops execution of the I/O request to the secondary system and then performs single writing only on the primary system.

Upon detection or notification of the failure in the secondary system, the host 300 accordingly updates the V state management information 305 by the V state managing unit 301, thereby separating and blocking the entire or part of the storage apparatus 200 of the secondary system in the failed state.

The host 300 issues a synchronization instruction, that is, an instruction for synchronizing data of the primary and secondary systems for return to the redundant state (C1) to the storage apparatus 100 of the primary system in the normal state.

In the normal storage apparatus (100), upon reception of the above-described synchronization instruction through the communication link 401, a synchronization process is accordingly started. With mainly using the synchronization point detecting unit 123, between the target primary and secondary data Vs (51, 52) and JNLs (61, 62) of the primary and secondary storage apparatuses (100, 200), the process of synchronizing the JNLs and the data Vs is performed via the inter-storage communicating unit 122 and the communication link 403.

In the synchronization process, the normal-side storage apparatus (100) first checks whether an operation (copying) can be performed on the target data V (52) and JNL (62) of the recovery-target-side storage apparatus (200) by the synchronization point detecting unit 123, and issues an instruction for reading the latest synchronization marker in the target JNL. Based on the instruction from the primary storage apparatus 100, the secondary storage apparatus 200 reads and transmits the check results and the latest synchronization marker from the secondary JNL 62.

The primary storage apparatus 100 reads JNL data with the number of the latest synchronization marker and thereafter from the primary JNL 61 in its own device, and then transfers the read JNL data to the secondary storage apparatus 200 through the inter-storage communicating unit 122 and the communication link 403.

In the secondary storage apparatus 200, the JNL data received from the primary storage apparatus 100 is additionally stored in the secondary JNL 62, thereby synchronizing the contents of the secondary JNL 62 with those of the primary JNL 61.

The restoring unit 124 of the secondary storage apparatus 200 performs data reflection (that is, overwriting for update) onto the secondary data V 52 based on the data of the updated secondary JNL 62, thereby synchronizing the contents of the secondary data V 52 with those of the primary data V 51.

C3: Return to Redundancy State

Next, in FIG. 5, at the time of return to redundancy after failure detection (C3), when synchronization of the target JNLs and data Vs between the primary and secondary storage apparatuses (100, 200) has been completed, it is confirmed whether the synchronization of the primary and secondary systems for return to redundancy has been normally completed between these primary and secondary storage apparatuses and the host 300 (in other words, a response to the above synchronization instruction is issued). For example, immediately after the completion of the synchronization process in C2, the primary and secondary storage apparatuses (100, 200) each issue a completion notification for return to redundancy to the host 300 from the synchronization point detecting unit 123. In this case, the completion notification to the host 300 is a certain form of communication and information for notifying (reporting to) the host 300 that synchronization of the JNLs (61, 62) and the data Vs (51, 52) in the primary and secondary systems has been completed. Then, immediately after the completion of the above synchronization process, depending on whether the secondary system (the system to be recovered) has been recovered or not, the control and process are branched into (A) and (B) as follows.

(A) The Case where the Secondary System has been Recovered

It is assumed that, after the completion of the synchronization process, the communication link 403 which is a failed portion of the secondary system is recovered through an operation of the administrator or an automatic support process. Upon reception of the completion notification from both of the primary and secondary storage apparatuses (100, 200) within a predetermined time period, the host 300 accordingly updates the V state management information 305, and then restarts redundant I/O onto the primary and secondary data Vs (51, 52). That is, the state is back to C1. In short, writing to the secondary data V 52 and the secondary JNL 62 which have been in an I/O-impossible state is restarted.

(B) The Case where the Secondary System has not Yet been Recovered

It is assumed that, after the completion of the synchronization process, the communication link 403 which is a failed portion of the secondary system has not yet been recovered or the recovery thereof has not yet been confirmed. In this state, due to the influence of the failure, the host 300 cannot receive the completion notification from the secondary storage apparatus 200. Therefore, if the host 300 cannot receive the completion notification from the secondary storage apparatus 200 even after a lapse of a predetermined period from the time when receiving the completion notification from the primary storage apparatus 100, the host 300 sets the target V of the secondary system to be in a single state (or remains the target V as it is in a single state) by using the V state management information 305 to block the entire or part of the secondary storage apparatus 200 (or remain the secondary storage apparatus 200 as it is in a blocked state). Then, the host 300 returns to C2, and issues a synchronization instruction again to repeat the attempts similar to those in C2 and C3 until return to redundancy is normally achieved.

Here, the program 120 may be provided with a processing unit for reporting the V state to the host 300.

Update Data History Information (JNL)

FIG. 6 depicts transitions of the contents of the primary JNL 61 shown on the upper side and the secondary JNL 62 shown on the lower side, and their related operation timings (T0 to T9) in chronological order (denoted by arrows in the right direction). Blocks with numbers "1" to "15" each represent one unit of update data (in other words, update I/O information). The numbers of the update data also represent identification information and updating order, and each of the data Vs (51, 52) is overwritten with update data in ascending order of the numbers. Blocks with "M1" to "M5" represent synchronization markers each representing a synchronization point of the primary and the secondary. The numbers attached to the synchronization markers are for identifying the synchronization markers, and the larger the number is, the latest the synchronization point is. It is assumed herein that one unit of the update data corresponds to one update I/O. Note that it is needless to say that these numbers and others may be managed by other forms of information.

Starting from T0, update data "1","2", and "3",a synchronization marker "M1", and update data "4" and "5" are stored in this order in the primary and secondary JNLs (61, 62) (C1). Ti represents a data synchronization point when the synchronization marker "M1" is simultaneously written in the primary and secondary JNLs (61, 62). Up to the update data "5" at T2, data is simultaneously written in the primary and secondary JNLs (61, 62), and their contents coincide with each other.

Due to the occurrence of a failure in the secondary system at T3, the state becomes a single state only with the primary system, in which update I/O from the host 300 to the secondary volume 52 of the secondary storage apparatus 200 and writing to the secondary JNL 62 are impossible. Thereafter, until T4, the update I/O is reflected on the primary volume 51 in the primary system, and update data "6" to "11" and synchronization markers "M2" to "M4" are sequentially written in the primary JNL 61. However, in the secondary system, the update I/O is not reflected on the secondary volume 52 and no information is written in the secondary JNL 62 (C2).

At T4, as a result of the detection of a failure in the secondary system and start of recovery, a synchronization instruction for return to redundancy is issued from the host 300 to the normal primary system. At T5, as a JNL synchronization process, in the JNLs (61, 62) of the primary and secondary storage apparatuses (100, 200), the update data and the synchronization marker of JNL data "4" to "M4" after the latest synchronization point which are required for the synchronization are transferred from the primary system to the secondary system. That is, through the primary and secondary inter-storage communicating units 122 and the communication link 403, the corresponding JNL data is copied from the primary JNL 61 to the secondary JNL 62 to synchronize the contents of the primary and secondary JNLs (61, 62). After the JNL synchronization at T5, the secondary volume 52 is restored based on the JNL data, the contents of the data Vs (51, 52) are synchronized.

In this example, the case where recovery of the secondary system is not yet completed at T6 after the completion of data synchronization at T5 is shown. In this case, since the host 300 cannot receive a completion notification from the secondary system, it goes back to a control state as C2 described above. At T7, a synchronization instruction is issued again to the primary system. At T8, in accordance with the instruction, a similar synchronization process is performed in the primary and secondary systems, in which data "12" to "14" which are JNL data corresponding to the update I/O after the above T5 (the latest synchronization marker "M4") are transferred to the secondary system.

In this example, the case where recovery of the failed portion is completed at T9 is shown.

T10 is the point at which redundant writing and synchronization marker writing from the host 300 are restarted in the case where recovery of the failed portion of the secondary system is completed after the contents of the secondary JNL 62 catch up with the contents of the primary JNL 61 through the synchronization process. Thereafter, in the primary and secondary systems, update data "12" to "15" and a synchronization marker "M5" are sequentially written. T11 is a data synchronization point at which the synchronization marker "M5" is simultaneously written in the primary and secondary JNLs (61, 62) like at T1.

Note that, at the above T5 and T8, JNL transfer is collectively performed within a short period of time. Also, during and concurrently with such a JNL transfer process, as shown in the example of the update data "12" to "14", update I/O can be continuously performed.

Volume State Management

FIG. 7 shows transitions of states in the primary volume 51 of the primary storage apparatus 100 and the secondary volume 52 of the secondary storage apparatus 200 in the V state management information 305. Rows a to i each represent a state and its related operation, and transitions are chronologically made from the top row to the bottom row. The left side shows the state of the primary volume 51, whilst the right side shows the state of the corresponding secondary volume 52, in which each state is depicted as being divided into a device state and a copy state. Each state is identified by, for example, a status bit value. In this example, the state of the data Vs (51, 52) for state management required for redundancy control are exemplarily shown. Alternatively, more detailed management may be performed, such as management of the state of the communication links.

The device state includes "ACT" (active) and "INACT" (inactive). The copy state includes "COPY" (copy) and "SYNC" (synchronization). The device state is a state corresponding to the logical volume or the like. "ACT" represents a state where the target volume allows the I/O, whilst "INACT" represents an inactive state (corresponds to a blocked state) where the target volume does not allow the I/O. The copy state is a state regarding data copy between the storage apparatuses and logical volumes. "COPY" represents a state where a data copy process is in progress between the primary and secondary volumes (51, 52) (non-synchronization state), whilst "SYNC" represents a state where the data contents are synchronized between the primary and secondary volumes (51, 52) (synchronization state). Each state in FIG. 7 will be described together with the flow of the sequence shown in FIG. 8.

Entire Control Sequence

FIG. 8 depicts an example of a sequence of redundancy control and the entire process among the host 300, the primary volume 51 of the primary storage apparatus 100, and the secondary volume 52 of the secondary storage apparatus 200. Each capital S with a number such as Si represents a process step.

First, corresponding to the above C1, in the state a in the V state management information 305 of the host 300, the device states of the primary volume 51 and the secondary volume 52 are "ACT-ACT", and the copy states have not yet been set.

In the state a and S1 and S2, the host 300 provides redundant I/O to the primary and secondary data Vs (51, 52). Since the paths in both of the primary and the secondary systems are normal, update I/O to the primary and secondary data Vs (51, 52) and writing to the primary and secondary JNLs (61, 62) are normally completed.

Next, after the state a, corresponding to the above C2, a failure occurs on the communication link 402 in the secondary system including a path to the secondary volume 52 (at the above T3).

Next, at a state b, the primary and secondary device states are "ACT-INACT". That is, upon recognition of the failure in the secondary system, the host 300 updates the V state management information 305 so that the corresponding secondary volume 52 is blocked (updates the device state from "ACT" to "INACT"). In S3 and S4, the host 300 issues an I/O request in redundant I/O to the primary and secondary data Vs (51, 52). However, in S4, the I/O is not normally completed at S4 due to the failure in the secondary system. As with the above T3 and T4, update data and a synchronization marker are written only in the primary JNL 61 of the normal system.

Next, in S5, for the primary volume 51 taken as a target, the host 300 transmits a synchronization instruction for return to a redundant state to the host I/F control unit 111 of the primary storage apparatus 100. In S6, upon reception of the synchronization request from the host 300, the primary storage apparatus 100 checks the target secondary volume 52 through the inter-storage communicating unit 122 and the communication link 403, that is, performs the communication for confirming whether parameters of the synchronization instruction (S5) are accurate by the synchronization point detecting unit 123. In S7, the synchronization point detecting unit 123 of the secondary storage apparatus 200 confirms the state of the target secondary volume 52 and reports the state to the primary storage apparatus 100 side. For example, it is reported that the state is such that a copy operation for synchronization can be carried out.

On the other hand, after a lapse of a predetermined time from the transmission of the synchronization instruction in the above S5, the host 300 issues a request (inquiry) for checking the state of the target volume 51 to the primary storage apparatus 100 in S13. At this time, the synchronization process in the primary and secondary systems is still in progress. Therefore, in S14, the primary storage apparatus 100 reports as a response to the host 300 that the copy state of the primary volume 51 is "COPY". Upon reception of the state report from the primary storage apparatus 100, the host 300 updates the V state management information 305 to a state c "ACT (COPY)-INACT". That is, the copy state of the primary volume 51 is updated to "COPY". Since the host 300 has recognized in S14 that copying is in progress in the primary and secondary systems, the host 300 does not have to subsequently issue a request for a state check similar to that in S13 to the secondary system.

After the state c, while setting the copy state of the primary volume 51 as "COPY", an inter-disk data copy process for JNL synchronization is in progress between the primary and secondary storage apparatuses (100, 200) through the inter-storage communicating unit 122 and the communication link 403.

Returning to S8 that follows the above S7, after the checking in the above S6, the synchronization point detecting unit 123 of the primary storage apparatus 100 transmits a marker request to the synchronization point detecting unit 123 of the secondary storage apparatus 200. This request is a request for reading the latest synchronization marker (that is, the one with the largest number) for detecting the synchronization point of the primary and the secondary. In S9, in response to the request, the secondary storage apparatus 200 reads the latest synchronization marker retained in the secondary JNL 62 and reports it to the primary storage apparatus 100. In this example, at the above T4, the latest synchronization marker "M1" in the secondary JNL 62 is reported.

Next, in S10 to S12, the primary storage apparatus 100 compares the latest synchronization marker from the secondary storage apparatus 200 with the data in its own primary JNL 61, and then transfers (performs data copying of) differential JNL data required for the secondary volume 52 and the secondary JNL 62 to synchronize with the primary side to the secondary storage apparatus 200 side through the inter-storage communicating unit 122 and the communication link 403. In this example, at the above T5, the JNL data "4" to "M4" are transferred in the divided three steps S10 to S12. The secondary storage apparatus 200 then reflects the JNL data received from the primary storage apparatus 100 onto the secondary JNL 62, thereby synchronizing the primary and secondary JNLs. Then, the restoring unit 124 reflects the data of the secondary JNL 62, that is, the update data "6" to "11" required for data V synchronization onto the secondary volume 52, thereby synchronizing the secondary volume 52 with the primary volume 51.

Note that, immediately after the synchronization is completed after S12, as described in the above C3, a completion notification may be transmitted from the primary and secondary storage apparatus sides to the host 300. As an alternative processing method, FIG. 8 shows a processing method of performing communication for state check (S13, S15, S25, S27, S29, etc.) from the host 300 side to the primary and secondary storage apparatuses. For example, for each lapse of a predetermined period, the host 300 transmits a request for state check to the primary and secondary storage apparatuses. Then, in accordance with the request, each storage apparatus reports the state of the target data V. In accordance with the report from the storage apparatuses, the host 300 updates the V state management information 305 and updates the redundancy control state. This communication for state check is repeated until information indicating the state where data V synchronization has been completed is received from the storage apparatuses of both systems. Any of these two processing methods for the host 300 to check the completion of the synchronization of the primary and secondary systems can be used.

Next in S15, after a lapse of a predetermined time from the above S13, the host 300 transmits a request for checking the state of the target data V to the primary storage apparatus 100. In S16, the primary storage apparatus 100 reports the state of the target volume to the host 300. At this time, data copying has been completed between the primary and secondary volumes (51, 52) before S12, and therefore the volumes are in a synchronized state. Therefore, the primary storage apparatus 100 reports to the host 300 that the copy state of the primary volume 51 is "SYNC" as a completion notification of FIG. 5 described above. Upon reception of the report, the host 300 updates the V state management information 305 to a state d "ACT(SYNC)-INACT". That is, the copy state of the primary volume 51 is updated from "COPY" to "SYNC".

Also in S17 subsequent to S15, the host 300 transmits a request for checking the state of the target data V 52 to the secondary storage apparatus 200. However, at this point, the failure on the communication link 402 of the secondary system is not yet recovered, and therefore the state check cannot be completed. The host 300 waits for a response for a predetermined time after transmitting the request for the state check. However, in S18, a timeout occurs due to a lapse of the predetermined time.

After the state d, the primary volume 51 is in a state where data synchronization in the primary and secondary data Vs (51, 52) has been completed with the completion of the above-described copying process. Also, in the secondary system, the path to the secondary volume 52 has been still failed and not yet been recovered.

After the timeout in S18, the host 300 transmits again in S19 a synchronization instruction similar to that in S5 to the primary storage apparatus 100. In S20 to S24, a synchronization process for the JNLs and the data Vs similar to that in S6 to S12 described above is performed. Due to a lapse of time from the previous synchronization process, the primary system now has stored therein new update data "12" to "14" as shown in FIG. 6. Also, since the state has not been checked after a lapse of a predetermined time from S15, a similar request for state check is again transmitted in S25 and S26 from the host 300 to the main storage apparatus 100. At this point of time, as with S13 and S14, a copying process is in progress between the primary and the secondary. Therefore, in S26, the copy state of the primary volume 51 is reported as "COPY". Upon reception of the report, the host 300 updates the V state management information 305 to a state e "ACT (COPY)-INACT". That is, the copy state of the primary volume 51 is updated from "SYNC" to "COPY".

Next, after the state e, corresponding to the above C3, the recovery of the failure on the communication link 402 in the secondary system including the path to the secondary volume 52 is completed (the above T9).

Next, in S27, the host 300 transmits a request for state check again to the primary storage apparatus 100 after a lapse of a predetermined time from the above S25. In S28, the primary storage apparatus 100 reports the state where the primary volume 51 is in "SYNC". Upon reception of the report, the host 300 updates the V state management information 305 to a state f "ACT (SYNC)-INACT". That is, the copy state of the primary volume 51 is updated from "COPY" to "SYNC". In S29 subsequent to S27, the host 300 transmits a request for state check to the secondary storage apparatus 200. In S30, the secondary storage apparatus 200 reports the state where the secondary volume 52 is in "SYNC". Upon reception of the report, the host 300 updates the V state management information 305 to a state g "ACT (SYNC)-INACT (SYNC)". That is, the copy state of the secondary volume 52 is updated to "SYNC".

After the state g, it is confirmed that synchronization has been completed in the primary and secondary volumes 51 and 52. As a process in response to the synchronization instruction in S19, the host 300 confirms the completion of synchronization in the primary and secondary systems from both of the primary and secondary storage apparatuses, and then updates the V state management information 305 to a state h "ACT (SYNC)-ACT (SYNC)". That is, the device state of the secondary volume 52 is updated to "ACT".

After the state h, the host 300 restarts I/O to the secondary volume 52 of the secondary storage apparatus 200. In a state i, the V state management information 305 is "ACT-ACT". In S31 and S32, the host 300 provides redundant I/O to the primary and secondary volumes.

As described above, according to this embodiment, under a redundant writing environment including the host 300 and the primary and secondary storage apparatuses (100, 200), at the time of the return to redundancy, most of the synchronization process (mainly JNL data copying process) is performed between the primary and secondary storage apparatuses (100, 200) not through the host 300 (that is, the host 300 is involved in control communication only). Also, the JNL data for inter-storage data copying is determined by the latest synchronization marker, and the entire copy of the data V and the JNL data is not required. Therefore, inter-storage data copying, which is conventionally performed via the host 300, and a halt of the normal task at the time of the above copying can be minimized, and thus redundancy control in which process load on the host 300 and trouble for the user are reduced can be achieved.

Second Embodiment

In the second embodiment as another embodiment, in brief, as a redundancy control method in a storage system, a journal including update data and a synchronization marker from a host is stored in another external computer instead of primary and secondary storage apparatuses for redundant writing. Each of the primary and secondary storage apparatuses communicates with the external computer according to need to use the journal, and performs the control for return to redundancy similar to that described in the first embodiment.

FIG. 9 depicts the configuration of a storage system according to the second embodiment. In the first embodiment, the primary and secondary JNLs (61, 62) are stored in the storage areas (logical volumes) in the primary and secondary storage apparatuses (100, 200), respectively. In the second embodiment, however, journal data is stored in a storage area (JNL managing unit 501) in an external computer 500 communicably connected outside the storage apparatuses (100, 200). Each of the storage apparatuses (100, 200) basically does not have the JNL data therein other than JNL for temporary processing (61b, 62b) and communicates with the JNL managing unit 501 through the JNL communicating unit 125 to use the JNL data when necessary. Although the method of managing the journal is different, other control is similar to that in the first embodiment.

For example, the host 300, the primary storage apparatus 100, the secondary storage apparatus 200, and the external computer 500 are connected to a network 410. It is assumed that communication connection (communication link 401, etc.) similar to that in the first embodiment is possible on the network 410.

The external computer 500 includes the JNL managing unit 501 for storing and managing a JNL (original journal) 60 equivalent to the above JNLs (61, 62). The external computer 500 is an apparatus having a memory for storing at least a JNL, a processor, and a communication I/F function.

Each of the primary and secondary storage apparatuses (100, 200) has the JNL communicating unit 125 which is the processing unit corresponding to the JNL managing unit 501. The JNL communicating unit 125 communicates with the JNL managing unit 501 of the external computer 500 to refer to, acquire, and update the data of the JNL 60. Thus, without retaining the above-described primary JNL 61 and secondary JNL 62 in the respective storage apparatuses, the JNLs for temporary processing (61b, 62b) can be acquired and processed.

An example of a process according to the second embodiment is as follows. A doubling unit 320b of the host 300 provides redundant I/O and performs synchronization marker writing on the primary and secondary storage apparatuses (100, 200). Also, a JNL retaining unit 121b writes update data and a synchronization marker in the JNL managing unit 501 through the JNL communicating unit 125. Alternatively, update data and a synchronization marker may be written from the host 300 to the JNL 60 of the external computer 500. At the time of the return to redundancy, each of the primary and secondary storage apparatuses (100, 200) accesses the data of the JNL 60, and obtains a copy of a required portion of the data to use it in a process such as the above-described data V synchronization.

The second embodiment has an effect that memory can be saved because the entire JNL does not have to be retained in each storage apparatus.

Note that the JNL 60 in the external computer 500 is accessed from both of the primary storage apparatus 100 and the secondary storage apparatus 200. Therefore, it is effective that the external computer 500 is provided with a communication processing function and is disposed in the storage system with consideration that these accesses can be made at a higher speed. Also, the external computer 500 may be taken as a third storage apparatus, for example. Furthermore, although the primary and secondary JNLs are stored in the single external computer 500 in this example, these JNLs can be stored separately in two or more external computers, for example.

In another embodiment, the method can be applied not only to data doubling but also to quadrupling and others. Also, for data redundancy, instead of using redundant writing (scheme of providing update I/O to the primary and secondary systems at approximately the same timing), a scheme of using a remote copying function (inter-storage communicating unit 122) between the primary and secondary systems to create a copy of the data of the primary system in the secondary system may be used. Furthermore, other than the primary and secondary data Vs (51, 52), mirror Vs thereof may be retained and used in the respective storage apparatuses.

In the foregoing, the invention made by the inventor of the present invention has been concretely described based on the embodiments. However, it is needless to say that the present invention is not limited to the foregoing embodiments and various modifications and alterations can be made within the scope of the present invention.

The present invention can be utilized for a storage control system such as a storage system for redundantly storing data and an apparatus of such a system.

What is claimed is:

1. A storage system for redundant writing of data from a host computer into a first volume of a first storage apparatus and a second volume of a second storage apparatus, said storage system performing processes comprising:

a first process in which information including update data from said host computer in said redundant writing is retained in said first storage apparatus as first update data history information and in said second storage apparatus as second update data history information; and when one of a first redundant writing system including said first storage apparatus and a path from said host computer to said first volume and a second redundant writing system including said second storage apparatus and a path from said host computer to said second volume changes into a failed state where I/O is impossible while the other one of the redundant writing systems remains normal, second and third processes are preformed to return said failed redundant writing system back to a normal state where said redundant writing is possible, a second process in which said first and second storage apparatuses communicate with each other regarding the update data history information of the storage apparatus of the normal redundant writing system, data after a latest synchronization point required for synchronization of data contents of said first and second volumes is copied and transferred not through said host computer but directly from the storage apparatus of the normal redundant writing system to the storage apparatus of the failed redundant writing system which is to be recovered; and a third process in which the storage apparatus of said failed redundant writing system reflects the copied data onto the volume thereof based on the update data history information obtained through transfer between said storage apparatuses to synchronize said first and second volumes.

2. The storage system according to claim 1, wherein said storage system performs processes further comprising: a process in which, concurrently with said first process, information for identifying a synchronization point of said first and second volumes in data redundancy is periodically written from said host computer into the first and second update data history information of said first and second storage apparatuses; and in said second process, said latest synchronization point is detected by reading said information for identifying the synchronization point stored in said first and second update data history information through communication between said first and second storage apparatuses, and the data of said update data history information to be transferred between said first and second storage apparatuses is determined.

3. The storage system according to claim 2, wherein, at the time of the return to said normal state, said host computer issues an instruction for synchronization of the data contents of said first and second volumes to the storage apparatus of said redundant writing normal system, and the storage apparatus of said normal redundant writing system receives said instruction and works in conjunction with the storage apparatus of said failed redundant writing system to perform said second and third processes, and after said third process is completed, through communication between said host computer and said first and second storage apparatuses, said host computer confirms from said first and second storage apparatuses that said synchronization has been completed and then restarts said redundant writing.

4. The storage system according to claim 3, wherein, immediately after said third process is completed, each of said first and second storage apparatuses issues a notification that said synchronization has been completed to said host computer, and when said host computer receives said notification from both of said first and second storage apparatuses, said host computer allows said redundant writing to return to said normal state, and if the notification from both of said first and second storage apparatuses cannot be received even after a lapse of a predetermined time, said host computer returns to the process of issuing said instruction for synchronization and repeats said synchronizing and confirming processes until receiving the notification from both of said first and second storage apparatuses.

5. The storage system according to claim 3, wherein, after issuing said instruction for the synchronization, said host computer issues a request for checking a state of the volumes of the storage apparatuses to each of said first and second storage apparatuses at a predetermined time interval, in response to said request, each of said first and second storage apparatuses issues a report of the state of the volume thereof to said host computer, and when said host computer receives said report of the state indicating that said synchronization has been completed from both of said first and second storage apparatuses, said host computer allows said redundant writing to return to said normal state, and if said host computer cannot receive said report even after waiting for a predetermined period from the transmission of said request, said host computer returns to said process of issuing the instruction for the synchronization and repeats the synchronizing and confirming process until receiving said report from both of said first and second storage apparatuses.

6. A redundancy control method for redundant writing of data from a host computer into a first volume of a first storage apparatus and a second volume of a second storage apparatus, said method comprising:

a first step of retaining information including update data from said host computer in said first storage apparatus as first update data history information and in said second storage apparatus as second update data history information; and when one of a first redundant writing system including said first storage apparatus and a path from said host computer to said first volume and a second redundant writing system including said second storage apparatus and a path from said host computer to said second volume changes into a failed state where I/O is impossible while the other one of the redundant writing systems remains normal, following steps are preformed to return said failed redundant writing system back to a normal state where said redundant writing is possible, a second step of issuing an instruction for synchronization of data contents of said first and second volumes from said host computer to the storage apparatus of the normal redundant writing system;

a third step of communicating between said first and second storage apparatuses regarding said first and second update data history information in accordance with said instruction;

a fourth step of copying and transferring data after a latest synchronization point required for synchronization of the data contents of said first and second volumes in the update data history information of the storage apparatus of said normal redundant writing system to the storage apparatus of the failed redundant writing system not through said host computer;

a fifth step of reflecting data of the update data history information obtained through the transfer between said storage apparatuses onto said volume of the storage apparatus of said failed redundant writing system, thereby synchronizing the data contents of said first and second volumes;

a sixth step of communicating between said host computer and said first and second storage apparatuses after said instruction, and receiving information about a state of the volumes of said storage apparatuses; and a seventh step of, when said host computer confirms that said synchronization has been completed by receiving said information about the state from both of said first and second storage apparatuses, allowing said redundant writing to return to said normal state, and when said host computer cannot confirm said synchronization from both of said storage apparatuses even after a lapse of a predetermined time, returning to said second step and retrying until confirming that said synchronization has been completed from both of said storage apparatuses.

7. A program embedded in a computer readable medium for redundant writing of data from a host computer into a first volume of a first storage apparatus and a second volume of a second storage apparatus, comprising:

a module for retaining information including update data from said host computer in said first storage apparatus as first update data history information and in said second storage apparatus as second update data history information; and when one of a first redundant writing system including said first storage apparatus and a path from said host computer to said first volume and a second redundant writing system including said second storage apparatus and a path from said host computer to said second volume changes into a failed state where I/O is impossible while the other one of the redundant writing systems remains normal, following modules perform to return said failed redundant writing system back to a normal state where said redundant writing is possible, a module for issuing an instruction for synchronization of data contents of said first and second volumes from said host computer to the storage apparatus of the normal redundant writing system;

a module for communicating between said first and second storage apparatuses regarding said first and second update data history information in accordance with said instruction;

a module for copying and transferring data after a latest synchronization point required for synchronization of the data contents of said first and second volumes in the update data history information of the storage apparatus of said normal redundant writing system to the storage apparatus of the failed redundant writing system not through said host computer;

a module for reflecting data of the update data history information obtained through the transfer between said storage apparatuses onto said volume of the storage apparatus of said failed redundant writing system, thereby synchronizing the data contents of said first and second volumes;

a module for communicating between said host computer and said first and second storage apparatuses after said instruction, and receiving information about a state of the volumes of said storage apparatuses; and a module for, when said host computer confirms that said synchronization has been completed by receiving said information about the state from both of said first and second storage apparatuses, allowing return to said normal state, and when said host computer cannot confirm said synchronization from both of said storage apparatuses even after a lapse of a predetermined time, returning to said module for issuing an instruction and retrying until confirming that said synchronization has been completed from both of said storage apparatuses.

* * * * *